US007808425B2

(12) United States Patent
Martin Neira et al.

(10) Patent No.: US 7,808,425 B2
(45) Date of Patent: Oct. 5, 2010

(54) SPACE-BORNE ALTIMETRY APPARATUS, ANTENNA SUBSYSTEM FOR SUCH AN APPARATUS AND METHODS FOR CALIBRATING THE SAME

(75) Inventors: Manuel Martin Neira, Oegstgeest (NL); Salvatore D'Addio, Leiden (NL)

(73) Assignee: Agence Spatiale Europeenne, Paris Cedex (FR)

( * ) Notice: Subject to any disclaimer, the term of this patent is extended or adjusted under 35 U.S.C. 154(b) by 0 days.

(21) Appl. No.: 12/236,025

(22) Filed: Sep. 23, 2008

(65) Prior Publication Data

US 2010/0073217 A1   Mar. 25, 2010

(51) Int. Cl.
G01S 13/08 (2006.01)
G01S 7/40 (2006.01)
G01S 13/00 (2006.01)
G01S 7/02 (2006.01)

(52) U.S. Cl. .................. 342/120; 342/118; 342/165; 342/173; 342/174; 342/175; 342/195

(58) Field of Classification Search .................. 342/118, 342/120–123, 165, 173–175, 189–197, 25 R–15 F, 342/26 R, 26 A, 59, 357.01–357.17, 450, 342/451, 453, 458, 462–465, 147, 157, 198, 342/350, 368, 376, 188; 701/200, 207, 213–216; 343/700 R, 753–755
See application file for complete search history.

(56) References Cited

U.S. PATENT DOCUMENTS

| | | | | |
|---|---|---|---|---|
| 3,171,126 A | * | 2/1965 | Wiley | 342/458 |
| 3,267,270 A | * | 8/1966 | Smidowicz | 342/123 |
| 3,648,284 A | * | 3/1972 | Dax et al. | 342/198 |
| 4,386,355 A | * | 5/1983 | Drew et al. | 342/357.01 |
| 4,580,140 A | * | 4/1986 | Cheston | 343/754 |
| 4,595,925 A | * | 6/1986 | Hansen | 342/123 |
| 4,828,382 A | * | 5/1989 | Vermilion | 342/120 |
| 5,187,485 A | * | 2/1993 | Tsui et al. | 342/357.08 |
| 5,546,087 A | * | 8/1996 | Martin Neira | 342/120 |

(Continued)

OTHER PUBLICATIONS

M. Martin-Neira et al., "The PARIS Concept: An Experimental Demonstration of Sea Surface Altimetry Using GPS Reflected Signals"; IEEE Transactions on Geoscience and Remote Sensing; vol. 39, No. 1; Jan. 2001; pp. 142-150.*

(Continued)

*Primary Examiner*—Bernarr E Gregory
(74) *Attorney, Agent, or Firm*—Alston & Bird LLP

(57) ABSTRACT

The present invention is directed to a space-borne altimetry apparatus having a first receiving antenna, pointing to outer space, for receiving at least one signal emitted by a remote satellite emitter via a direct path; a second receiving antenna, pointing to the Earth, for receiving said signal via an indirect path including a reflection from the Earth surface; and a signal processing means for computing a distance of the apparatus from a specular reflection point of the signal on the Earth surface by cross-correlating the signals received by said first and second antennas; wherein both the first and second receiving antennas are high-gain steerable antennas; and wherein the apparatus may also include antenna control means for steering at least one receiving lobe of the first antenna toward the remote satellite emitter, and at least one receiving lobe of the second antenna toward a specular reflection point on the Earth surface.

17 Claims, 4 Drawing Sheets

U.S. PATENT DOCUMENTS

| | | | |
|---|---|---|---|
| 5,703,594 A * | 12/1997 | Anderson | 342/123 |
| 6,025,800 A * | 2/2000 | Hager | 342/450 |
| 6,137,433 A * | 10/2000 | Zavorotny et al. | 342/26 A |
| 6,232,922 B1 * | 5/2001 | McIntosh | 342/453 |
| 6,417,813 B1 * | 7/2002 | Durham | 343/753 |
| 6,549,165 B2 * | 4/2003 | Neira et al. | 342/462 |
| 6,774,837 B2 * | 8/2004 | Barrick et al. | 342/26 R |
| 6,943,743 B2 * | 9/2005 | Durham et al. | 343/753 |
| 7,265,710 B2 * | 9/2007 | DeAgro | 342/120 |
| 2005/0030236 A1 * | 2/2005 | Durham et al. | 343/753 |

OTHER PUBLICATIONS

A. Rius et al., "Sea Surface State Measured Using GPS Reflected Signals"; Geophysical Research Letters; 29(23): NIL_21_24; Dec. 2002; American Geophysical Union; 18 pages.*

* cited by examiner ered in the description, taken
SPACE-BORNE ALTIMETRY APPARATUS, ANTENNA SUBSYSTEM FOR SUCH AN APPARATUS AND METHODS FOR CALIBRATING THE SAME

FIELD OF THE INVENTION

The invention relates to a space-borne altimetry apparatus, to an antenna subsystem for such an apparatus and to methods for calibrating the same. The invention applies in particular to ocean altimetry.

BACKGROUND OF THE INVENTION

Conventional ocean altimetry methods are based on air- or space-borne monostatic radars. These methods are mostly limited to nadir-looking instruments with a comparatively narrow swath, and therefore they are not able to provide high spatial-temporal sampling, necessary to map properly ocean mesoscale features, unless deployed in ad-hoc constellations.

The wide swath ocean altimeter has been envisaged as a potential solution to increase spatiotemporal sampling; however it is a very complex and costly solution. See W. J. Emery, D. G. Baldwin, D. K. Matthews, "Sampling the Mesoscale Ocean Surface Currents With Various Satellite Altimeter Configurations", IEEE Transactions on Geoscience and Remote Sensing, Vol. 42, No. 4, April 2004, 795.

In this context, since 1993 the European Space Agency and later European industry have been working on the idea to make use of GNSS (Global navigation Satellite System) signals reflected from the ocean's surface in order to perform altimetry. The technique, designated as "PARIS" (Passive Reflectometry and Interferometry System), has been investigated and experimentally proven by ESA, NASA and many other space and non-space related research organizations. PARIS is a very wide swath altimeter, capable of reaching a swath of 1000 km or more, depending on orbital altitude, as it picks up ocean-reflected (and direct) signals from several GNSS satellites, up to an average of 12 tracks, and up to a maximum number of 16-20 tracks, when Galileo will be available.

For a detailed description of the PARIS technique, see the following documents:

M. Martin-Neira, "A Passive Reflectometry and Interferometry system (PARIS): Application to Ocean Altimetry", ESA Journal, 1993;

U.S. Pat. No. 5,546,087 to M. Martin-Neira; and

G. A. Hajj, C. Zuffada, "Theoretical Description of a Bistatic System for Ocean Altimetry Using the GPS Signal", Radio Science, Vol 38, No 5, October 2003.

A PARIS altimeter essentially comprises an up-looking antenna, a down-looking antenna and signal processing means. The up-looking antenna is directed to the outer space, and receives signals emitted by one ore more "opportunity" satellite emitters, e.g. navigation signals emitted by GNSS satellites. The down-looking antenna is directed to the Earth, and receives replicas of these same signals reflected by the Earth surface. The signal processing means compute the distance of the apparatus from a specular reflection point of the signal on the Earth surface by cross-correlating the signals received by the up-looking and the down-looking antennas. From this distance, and assuming precise knowledge of the apparatus position, it is possible to determine the altitude of said specular reflection point with respect to a reference geoid. U.S. Pat. No. 5,546,087 discloses that the down-looking antenna should preferably by a highly directive phased array with multiple steerable receiving lobes directed towards the reflection points of the GNSS signals over the ocean, but it does not provide any specific teaching about the up-looking antenna. All PARIS experiments and proposals for flight versions of this altimeter up to now have assumed a low-gain up-looking antenna. In practice, this implies the need of generating code replicas on board, limiting the operation of the system to open access codes.

SUMMARY OF THE INVENTION

The present invention aims at providing an improved PARIS altimeter.

In particular, in order to benefit from the full power spectral density of the opportunity signals, even when they include restricted access codes, the invention provides with a PARIS altimetry system wherein both the up-looking and the down-looking antenna are high-gain directive and steerable antennas, and in particular phased array antennas. By "high gain" a directivity of at least 10 dB, preferably of at least 20 dB and even preferably of a least 27 dB is meant.

In a preferred embodiment of the invention, said antennas are identical to each other, except for polarization, and mounted back-to-back on a common supporting structure, front-end electronic circuitry being disposed between said up- and down-looking receiving antennas.

This new architecture is particularly advantageous because it is compact and symmetric, and allows any easy calibration of differences in delay and/or gain between the two signal paths, which could negatively affect altimetry accuracy.

BRIEF DESCRIPTION OF THE DRAWINGS

Additional features and advantages of the present invention will become apparent from the subsequent description, taken in conjunction with the accompanying drawings, which show.

DETAILED DESCRIPTION

Figure 1:
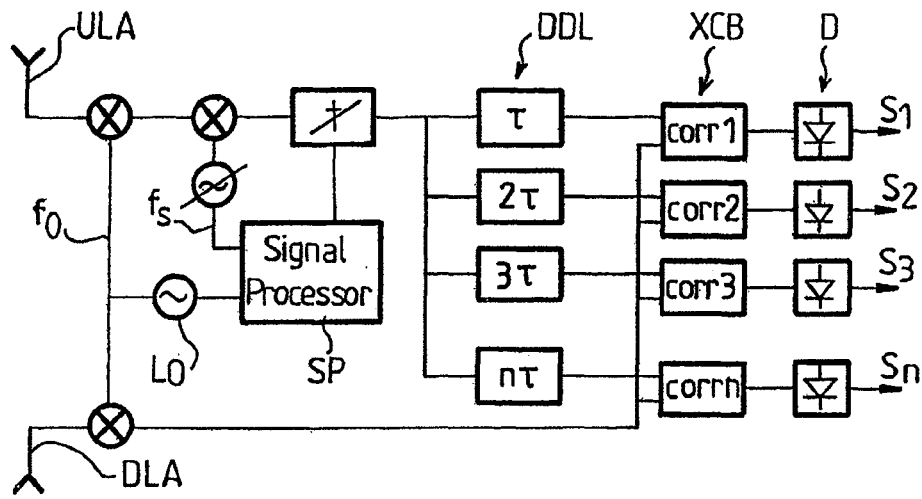
FIG. 1, a conceptual block diagram of PARIS altimetry.

FIG. 1, reproduced from U.S. Pat. No. 5,546,087, illustrates the principle of PARIS altimetry. An up-looking antenna ULA receives an "opportunity signal" (i.e. a signal not specifically generated for the purpose of altimetry), emitted by a satellite on a higher orbit; and a down-looking antenna DLA receives a replica of the same signal reflected by the Earth surface. In a conventional way, the received signals are down-converted at an intermediate frequency by mixing them with a sinusoidal signal at frequency $f_0$ generated by a local oscillator LO. The "direct" signal received by the up-looking antenna ULA is then frequency-shifted and delayed with respect to the reflected signal received by the down-looking antenna: this compensate for the (coarse) difference in propagation path length and in Doppler shift between the two signals. The time delay and the frequency shift $f_s$ are computed by a signal processor SP.

The "direct" signal passes through a discrete delay line DDL generating delayed replicas thereof, which are cross-correlated with corresponding replica of the reflected signal by a bank of correlators XCB. The correlation results are detected by respective detectors D, yielding a correlation waveform which contains information on the precise difference in path length between the "direct" and the "reflected" signals. In turn, this allows determination of the distance between the altimetry apparatus and the Earth surface.

As discussed above, U.S. Pat. No. 5,546,087 teaches that the down-looking antenna DLA should preferably be a multi-beam phased-array antenna, having a plurality of receiving lobes steerable in order to track corresponding reflection points on the Earth surface.

According to the present invention, the up-looking antenna should also be a high-gain steerable antenna, capable of tracking one or (preferably) more emitting satellites.

Figure 2:
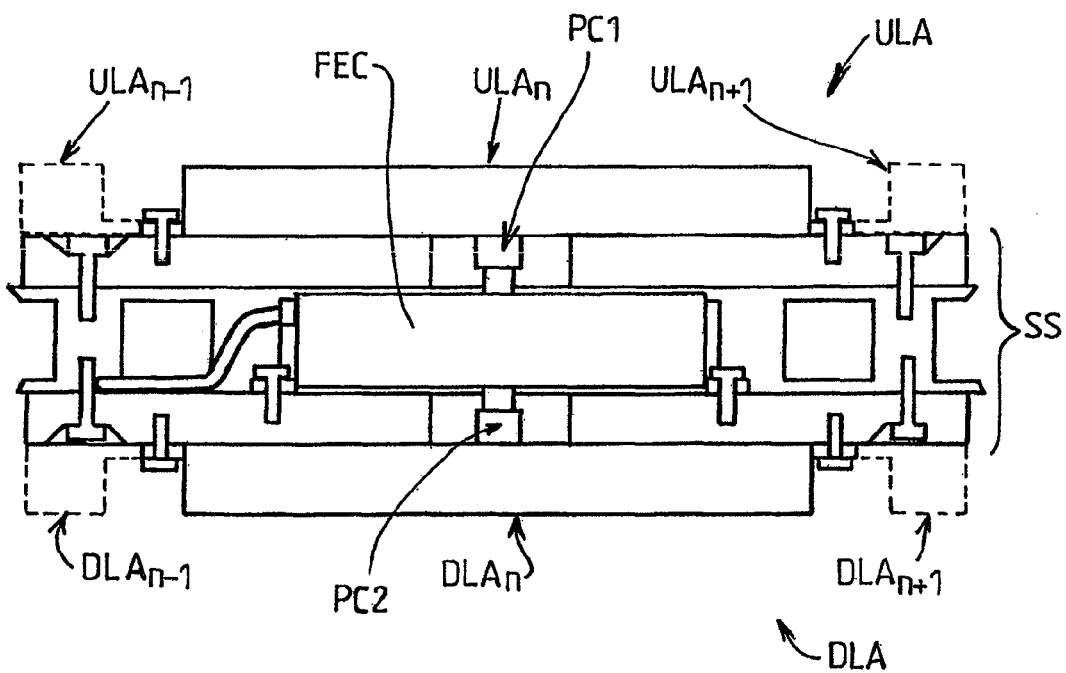
FIG. 2, the structure of an antenna subsystem according to the invention.

According to a preferred embodiment of the invention, depicted on FIG. 2, the up-looking and down-looking antennas (ULA, DLA) are substantially identical multibeam phased-array antennas, mounted back-to-back on a common supporting structure SS with front-end electronic circuitry "sandwiched" between them. The supporting structure SS can be constituted 3 o by two honeycomb panels surrounding an aluminum beam; the overall thickness of the structure can be of the order of 80 mm.

Advantageously, the only difference between the two phased arrays concerns their polarizations, which can be orthogonal in order to account for polarization changes induced by reflection by the Earth surface. For example, the up-looking array can right-hand circularly polarized (as are all the present and foreseen GNSS signals), while the down-looking array can have left-handed circular polarization.

Each phased array antenna ULA, DLA is constituted by a plurality of, generally identical, antenna elements ($ULA_{n-1}$, $ULA_n$, $ULA_{n+1}$, $DLA_{n-1}$, $DLA_n$, $DLA_{n+1}$). The number of elements in each array is mainly driven by the minimum signal to noise ratio to be achieved in the reception of the reflected signals. The field of view of each element is typically between 25° and 35° about boresight.

As shown on FIG. 2, each down-looking element (e.g. $DLA_n$) has a corresponding up-looking element (e.g. $ULA_n$) with which will be paired up through front-end electronics circuitry FEC. The paired antennas are connected to the front-end electronic box through pressure connectors PC1, PC2, and mechanically fixed to the two honeycomb plates of the supporting structure SS. The boxes housing the electronics are mounted on the same plates, keeping the same distance from the two antennas.

Besides being particularly compact, this mechanical arrangement is advantageous because the phase centers of both antennas are close together, minimizing their effect in the altimetric performance. Moreover, both the direct and reflected signals can be easily routed through pressure connectors PC1, PC2 from each array antenna element to the front-end electronic circuitry, minimizing noise, interferences and losses.

Figure 3:
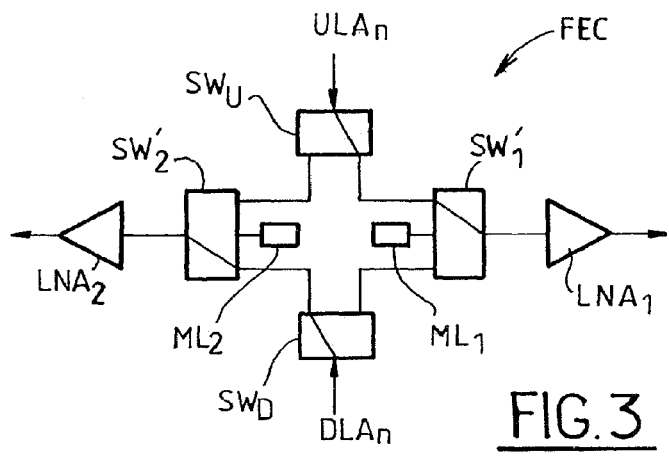
FIG. 3, a simplified scheme of the front-end electronic circuitry associated to a pair of antenna elements.

As shown on FIG. 3, front-end circuitry FEC essentially consists of two identical front end (i.e. low-noise) amplifiers $LNA_1$, $LNA_2$, a switching circuit ($SW_U$, $SW_D$, $SW'_1$, $SW'_2$), and two identical, preferably matched (i.e. 50Ω), loads $ML_1$, $ML_2$, whose temperatures are monitored e.g. by thermistors, acting as noise sources.

The switching circuit comprises:
a first and second two-way switches $SW_U$, $SW_D$, connected to an up-looking and a down-looking antenna element, respectively;
a first and second three-way switches $SW'_1$, $SW'_2$, each connecting a low-noise amplifier to one of the first and second two-way switches, or to one of the two matched loads.

This switch circuit has two functions. The first one is to allow swapping the receiving chains (including the low-noise amplifiers) and the antennas. By performing this swapping periodically and averaging the ranging obtained in each configuration, the relative delay between the up- and down-looking receiving chains can be calibrated out.

The second function of the switches is to enable the connection of the receivers to the matched load ML1, ML2, whose physical temperature is monitored. This, together with an attenuator in the intermediate frequency stages of the receivers, allows accurate gain calibration of the receivers. Gain and delay calibration will be described later with greater detail.

Figure 4:
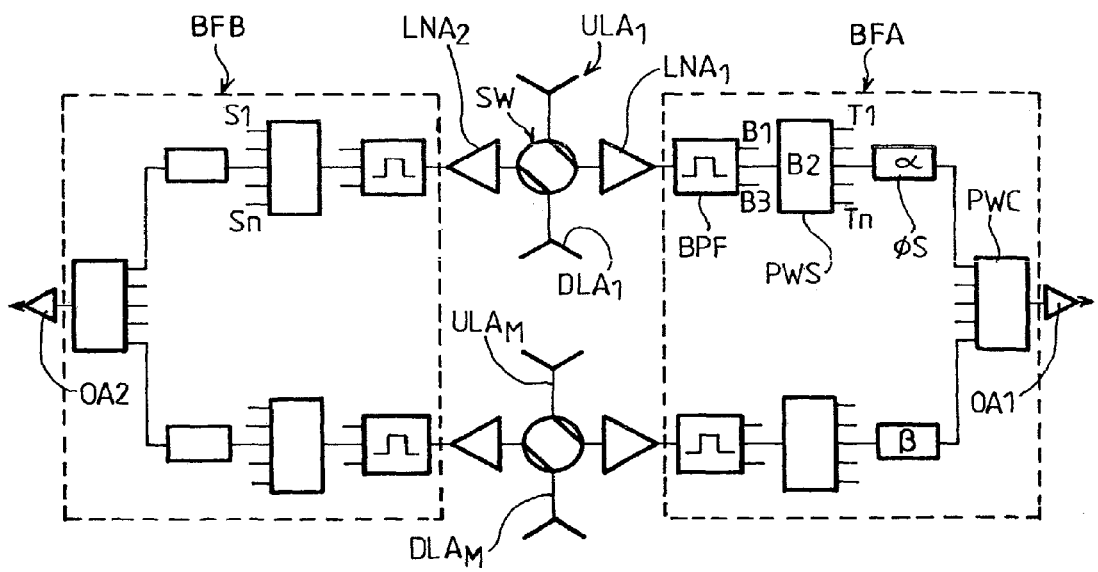
FIG. 4, a simplified scheme of front-end and beam-forming circuitry for an antenna subsystem according to the invention.

After low noise amplification the signals enter a beam-forming circuit, whose block diagram is depicted on FIG. 4. This beam-forming circuit comprises 2×B×N×M signal processing chains, where:
B is the number of frequency bands (B1, B2, B3 on the figure) in which the opportunity signals are decomposed; typically, current GNSS signals consist of three L-bands such as the GPS L1, L2 and L5;
N is the number of beams of the receiving antennas, corresponding to the number of emitting satellites (and of the corresponding reflection points on the Earth surface) which can be tracked independently from each other; an optimum number for N is 4 or 5 per GNSS constellation: if GPS, GLONASS, GALILEO and BEIDOU systems were going to be used, then N would preferably be between 16 and 20;
M is the number of antenna element for each receiving antenna, e.g. from a few tens to more than a hundred; and
the "2" factor accounts for up- and down-looking antennas.

These 2×B×N×M signal processing chains form two beam-forming blocks BFA and BFB, connected to respective first and second low-noise amplifiers $LNA_1$, $LNA_2$. Switching circuits SW directs the signals coming from the up-looking antenna toward the beam-forming block BFA and those coming from the down-looking antenna toward the beam-forming block BFB, or vice-versa.

FIG. 4 represents four signal processing chains, corresponding to the B2 band of antenna elements $ULA_1$, $DLA_1$, $ULA_N$ and $DLA_N$. Only one of these chains ($ULA_1$) will be described in detail, the other chains being essentially identical.

The signal received by antenna element ULA1 is directed by the switching circuit SW to low-noise amplifier LNA2, as described above. The amplified signal is then split into three bands B1, B2 and B3 by a bank of low-pass filters BPF. Alternatively, each antenna element may be provided with different connectors for different frequency bands. For example, the antenna elements might incorporate one output for GPS L1 and another connector for GPS L2 and L5. In such a case the frequency demultiplexing would happen only between L2 and L5, being the switch circuit and the LNA doubled for the L1 and L2+L5 receiver architectures.

The signals of each frequency band are then split into N branches using power splitters PWS, N being the number of GNSS transmitting satellites to be tracked (T1 . . . Tn) and their corresponding specular points (S1 . . . Sn).

If M is the number of antenna elements in each array, then a set of M outputs from the power splitters are properly phase shifted using phase shifters ΦS to track either the satellite emitters or the specular points on the Earth surface. The values of the phase shifts are calculated and continuously refreshed by the computer based on the information of a standard GNSS receiver. This GNSS receiver is connected to one of the up-looking antenna elements, for example by making a derivation at the output of the corresponding low-noise amplifier. This GNSS receiver must be able to track all GNSS systems which are being used by the altimeter.

The phase-shifted signals are then combined in a power combiner PWC to form the high gain beams, and amplified by an output amplifier OA1, OA2. In total N parallel high gain up-looking beams (or receiving lobes) track as many satellite emitters and N parallel high gain down-looking beams (or receiving lobes) track their corresponding specular reflection points.

Figure 5:
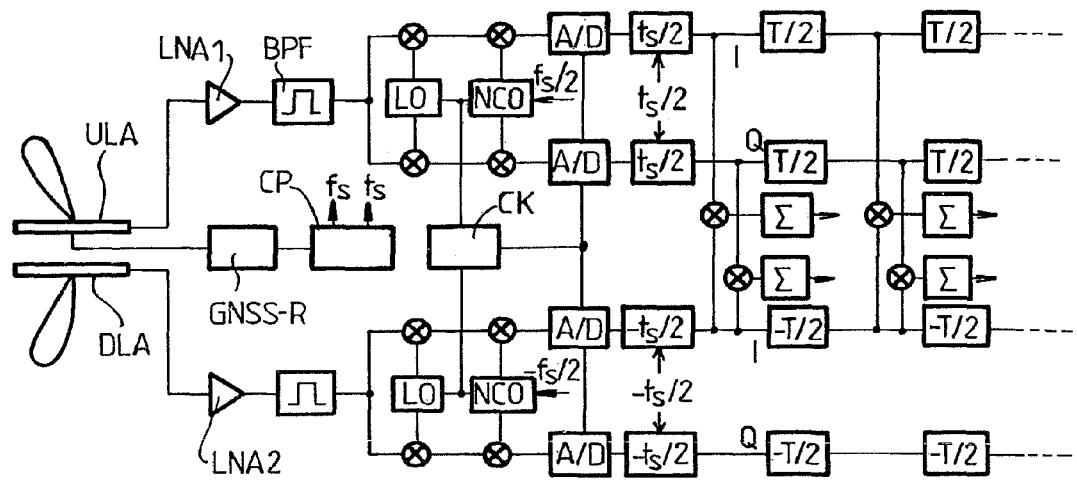
FIG. 5, a general block diagram of an altimetry system according to the invention.
Figure 7:
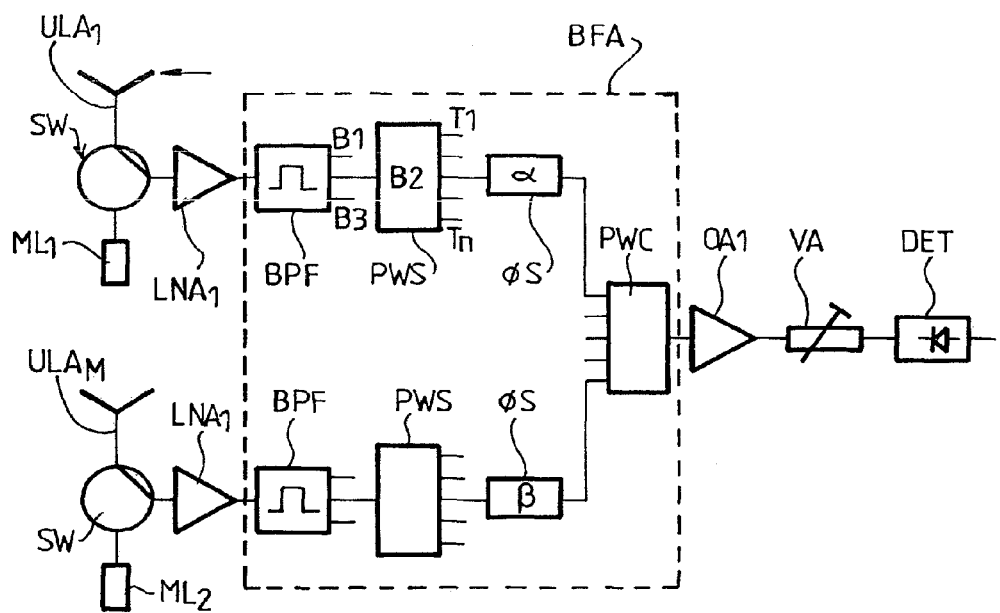
FIG. 7, a scheme of a method of calibrating an altimetry system according to the invention.

The general block diagram of a PARIS altimetry system according to the invention, shown on FIG. 5, is very similar to that of FIG. 1. However, the architecture is more balanced, in order to allow proper calibration of the internal delays. In particular, it can be noted that frequency shift ($f_s$) and time delay ($t_s$, T) are carried out, with opposite sign, on both the direct and the reflected signals, while in conventional PARIS (see FIG. 1) only the direct signal is shifted and delayed.

The switching and beam-shaping circuits are not depicted on FIG. 5 for the sake of simplicity.

The received direct signal is first amplified, band-pass filtered (BPF) and in-phase and quadrature down-converted using a local oscillator (LO) whose oscillating frequency $f_0$ is at the nominal centre frequency of a particular GNSS band (as GPS L1 for example). The intermediate frequency signals thus obtained are then shifted by $f_s/2$ in frequency (in opposite sign for the up- and down-looking) to match the Doppler-shift of each other thanks to a precise numerically controlled oscillator (NCO); both the LO and the NCO are driven by a master clock CK. The frequency shift $f_s$ can be determined from the knowledge of the positions and velocities of the space-borne altimeter, of the satellite emitters and of the specular reflection points on the Earth surface, all derived by a computer CP connected to a standard GNSS receiver GNSS-R. The estimation of the Doppler shift $f_s$, performed in real time, is used to continuously steer the NCO.

The frequency-shifted signals are then digitized by analog-to-digital converters A/D and time shifted to compensate for the additional delay of the reflected signal path. The amount of time shift $t_s/2$ (in opposite sign for the up- and down-looking) is computed from the known geometry, similarly to the Doppler estimation.

The frequency shifted and delayed direct and reflected signals are then complex cross-correlated. The cross correlation is evaluated at a time lag resolution T and with a number of lags compatible with the code chip rates and length of the waveform to observe. The cross correlation is performed over a coherence time corresponding to the first pulse-limited footprint.

The cross correlation waveforms are further accumulated by adders (reference Σ) to reduce speckle and data rate on board. These averaged waveforms are stored on-board until they are downlinked to ground. Further incoherent averaging may be performed by the ground processor.

The signal to—thermal— noise ratio (SNR) at the output of the cross correlator can be approximated as follows $$SNR = \frac{SNR_o}{1 + \frac{1+R_y}{R_x}}$$

where $R_x$ and $R_y$ are the signal to noise ratios of the up-link and down-link respectively, and $SNR_o$ is the signal to noise ratio if clean code replicas were generated on-board. Therefore, the fraction in the denominator represents the loss in SNR due to the use of the interferometric processing. This fraction is inherently small because $R_x$ is much larger than $R_y$, by construction, which makes the SNR of the interferometric processing comparable to that obtained when using clean codes. The fact that some codes cannot be replicated on-board because of their restricted access gives a clear advantage to the straight cross correlation over the use of clean codes.

Numerical simulations have been performed to compare the characteristics of the "interferometric" received power waveforms with the ones obtained with the adoption of conventional processing using clean replicas of known navigation codes at the same centre frequency.

Figure 6:
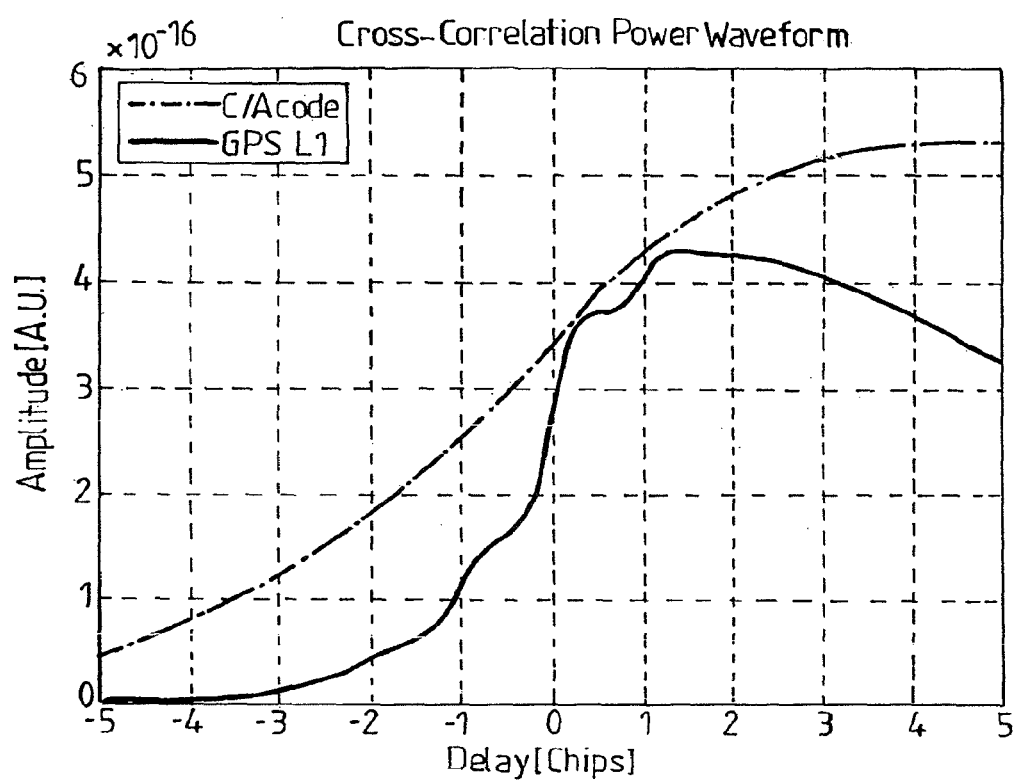
FIG. 6, cross-correlation waveforms illustrating a technical result of the invention.

The power reflected waveforms are calculated for a reference scenario. The main parameters are listed in following:
Orbit Altitude: 500 Km
Nadir Looking Geometry
Down-Looking Antenna Gain: 30 dBi As an example, FIG. 6 shows the GPS L1 "interferometric" power reflected waveform, obtained according to the invention, represented with a solid line. The waveform that is obtained using a clean replica of the open access C/A code is also shown with a dashed line. It can easily be seen that the "interferometric" processing provides more precise ranging due to the steeper slope of the tracking point (the point of maximum slope in the rising edge) with an acceptable degradation in signal amplitude.

As discussed above, calibration is a critical feature of PARIS altimetry, and even more in the case of "interferometric" processing, i.e. when, as in the present invention, no "clean" replicas of the direct signals are generated on-board. The architecture of the antenna subsystem of the invention is specifically designed in order to allow for easy and accurate delay and gain calibration of the different signal acquisition lines.

The invention includes a method for self-calibrating the internal delays within the electronics of the PARIS altimeter. The method consists basically in swapping arrays and receiving chains and averaging the measured delays of the specular point in the two swapped configurations. Swapping is achieved by means of the switch circuit in the front-end, and the change in sign in the Doppler shift coming out of the NCO and in the delay shift right after digitalization, i.e. after the A/D converter. With reference to FIG. 4, when the switch circuit connects the up-looking antenna with beam-former BFA and the down-looking antenna with beam-former BFB, the following signals are formed for the up- and down-looking links of a specific satellite emitter:

$x(t)=x_1(t-a-\alpha-e)+ \ldots +x_M(t-b-\beta-e)$ $y(t)=y_1(t-a'-\alpha'-e')+ \ldots +y_M(t-b'-\beta'-e')$ where
x(t) is the global signal received by the up-looking antenna, and $x_i(\cdot)$, with i=1−M, are the signals received by the individual up-looking antenna elements;

y(t) is the global signal received by the down-looking antenna, and $y_i(\cdot)$, with $i=1-M$, are the signals received by the individual down-looking antenna elements;

a and b are the total delays due to the LNA amplifier, BPF filter, power divider and power combiner for elements 1 and m of beam-former BFA respectively;

a' and b' are the corresponding total delays for beam-former BFB;

$\alpha$ and $\beta$ are the delays of the phase shifters for elements 1 and M of beam-former BFA respectively;

$\alpha'$ and $\beta'$ are the corresponding phase shifter delays for beam-former BFB;

e and e' are the total delays due to rest of the receiving chain beyond the output of the beam-formers and up to the correlator inputs.

The average delay between the direct and reflected signals is:

$$\tau_1 = \frac{1}{M}(a - a' + \alpha - \alpha' + \ldots + b - b' + \beta - \beta') + (e - e')$$

Similarly, when the switch circuit connects the up-looking antenna with beam-former BFB and the down-looking antenna with beam-former BFA, the signals become $$x(t) = x_1(t - a' - \alpha' - e') + \ldots + x_m(t - b' - \beta' - e')$$

$$y(t) = y_1(t - a - \alpha - e) + \ldots + y_m(t - b - \beta - e)$$

and the average delay $$\tau_2 = -\frac{1}{M}(a - a' + \alpha' - \alpha + \ldots + b - b' + \beta' - \beta) - (e - e')$$

If delay observations are made in the two configurations and then averaged, the residual receiver internal delay error is given by $$\tau = \frac{\tau_1 + \tau_2}{2} = \frac{1}{M}(\alpha - \alpha' + \ldots + \beta - \beta')$$

This is the average differential delay of the phase shifters when they are set to the two values corresponding to tracking of the satellite emitter and of its specular reflection. It can be shown that, for geometrical reasons, both values are close to each other (typically within 15°) and therefore the residual internal delay after the proposed calibration is likely to be very small. Nevertheless, the proposed technique can be further improved if look up tables of differential delays of the phase shifters are available from the ground characterization tests.

It should be noted that when the switch circuit is in its first position (up-looking antenna connected to BFA, down-looking antenna connected to BFB), the Doppler and time shifts are applied as shown in FIG. 5. These shifts must be applied with reversed sign when the switch circuit is in its second position (up-looking antenna connected to BFB, down-looking antenna connected to BFA).

The frequency of the delay calibration can be low, as delays change only slowly in-orbit. As an example, the instrumental delays could be obtained a few times per orbit using the average difference $$\tau_o = \frac{\tau_1 - \tau_2}{2} = \frac{1}{M}(a - a' + \ldots + b - b') + (e - e')$$

and transmitted to ground for correction in an altimetric ground processor.

Moreover, the invention allows accurate calibration of the waveform amplitudes by applying the "four-point technique", known from the paper by M. Brown, F. Torres, I. Corbella and A. Colliander, <<SMOS Calibration>>, IEEE Transactions on Geoscience and Remote Sensing, Vol. 46, No. 3, pp 646-658 (2008).

Calibration of the beam-forming block BFA is performed by connecting it to the up-looking antenna, and by measuring the cold sky and an internal noise source sequentially with and without an attenuator in the receiver chain. From the four output power levels of the four combinations it is possible to derive the end-to-end gain, offset and figure noise of the receiving chains.

To view the cold sky, the beams of the up-looking antenna have to be steered away from the satellite emitters, using the computer information. The output power is measured by a detector DET branched in the intermediate frequency section of the receiver, off the input of the A/D converter in the block diagram of the PARIS altimeter. Before the detector DET there is a variable attenuator VA which can take a first value (e.g. 0, i.e. no attenuation) and a second value (L); note that it is not necessary to know exactly the two values, provided that they remain constant during the calibration operation. Two power measurements of the cold sky are taken at each of the two attenuation values.

The internal noise source is constituted by matched loads $ML_1$, $ML_2$ which can be connected to the low noise amplifiers $LNA_1$, $LNA_2$ by the corresponding three-way switches $SW'_1$, $SW'_2$ (see FIG. 3). It is known that this is equivalent to presenting to the array a black body of infinite extension at a temperature equal to the physical temperature of the loads. The physical temperature of the loads must be therefore monitored using thermistors. As with the cold sky, two output power levels are measured with the internal loads connected at the input of the receivers for the two values of the IF attenuator, 0 and L.

This way, four independent measurements of output power levels (cold sky and internal load, for 0 and L attenuation) are performed. This provides with four independent equations, which allow determining the overall gain, offset and receiver noise figure of each up-looking high gain beam of beam-former BFA, together with the precise difference between the first and second attenuation values of the variable attenuator.

Calibration of beam-former BFB can be obtaining by connecting it to the up-looking antenna, by means of the switching circuits SW. However, this implies the assumption that the losses in the uplooking antenna are the same as in the down-looking antenna. A more accurate way of calibrating the beam-former BFB consists in rotating the satellite upside down—which is easily done by using inertial wheels—thus directing the "down-looking" antenna toward the outer space and the "up-looking" antenna toward the Earth. A possible implementation combining the advantages of both method consists in turning the satellite at regular, and rather long, intervals (e.g. once a month), and performing more frequent (e.g. several times per orbit) amplitude calibrations by swapping the BFB beam-former to the up-looking antenna.

We claim:

1. A space-borne altimetry apparatus comprising:
   a first receiving antenna, pointing to outer space, for receiving at least one signal emitted by a remote satellite emitter via a direct path;
   a second receiving antenna, pointing to the Earth, for receiving said signal via an indirect path including a reflection from the Earth surface; and
   signal processing means for cross-correlating the signals received by said first and second antennas;
   wherein both said first and second receiving antennas are directive and steerable antennas; and wherein said apparatus further comprises antenna control means for steering at least one receiving lobe of said first antenna toward said remote satellite emitter, and at least one receiving lobe of said second antenna toward a point on the Earth's surface specularly reflecting said signal emitted by a remote satellite emitter toward said second receiving antenna.

2. A space-borne altimetry apparatus according to claim 1, wherein both said first and second receiving antennas are multibeam antennas, said antenna control means being adapted for steering a plurality of receiving lobes thereof.

3. A space-borne altimetry apparatus according to claim 2, wherein both said first and second receiving antennas are phase-array antennas, each comprising a plurality of antenna elements.

4. A space-borne altimetry apparatus according to claim 3, wherein said first and second receiving antennas are identical to each other, except for polarization.

5. A space-borne altimetry apparatus according to claim 4, wherein said first and second receiving antennas are mounted back-to-back on a common supporting structure.

6. A space-borne altimetry apparatus according to claim 4, wherein said signal processing means comprise delay lines for applying symmetric delays to the signals received by said first and second receiving antennas.

7. A space-borne altimetry apparatus according to claim 4, wherein said signal processing means comprise frequency converters for applying symmetric Doppler compensation frequency shifts to the signals received by said first and second receiving antennas.

8. A space-borne altimetry apparatus according to claim 3, wherein said first and second receiving antennas are mounted back-to-back on a common supporting structure.

9. A space-borne altimetry apparatus according to claim 8, further comprising front-end electronic circuitry disposed between said first and second receiving antennas.

10. A space-borne altimetry apparatus according to claim 9, wherein said front-end electronic circuitry comprises:
    a plurality of first and second front-end amplifiers; and
    a plurality of respective switching circuits for connecting each element of said first receiving antenna to an input port of a respective first or second amplifier, and for connecting each element of said second receiving antenna to an input port of a respective second or first amplifier.

11. A space-borne altimetry apparatus according to claim 10, wherein said switching circuits are also for connecting the input ports of said first and second front-end amplifiers to respective temperature-monitored loads in order to perform absolute gain calibration.

12. A method of calibrating a space-borne altimetry apparatus comprising
    a first receiving antenna, pointing to outer space, for receiving at least one signal emitted by a remote satellite emitter via a direct path;
    a second receiving antenna, pointing to the Earth, for receiving said signal via an indirect path including a reflection from the Earth's surface, said first and second receiving antennas being mounted back-to-back on a common supporting structure;
    front-end electronic circuitry sandwiched between said first and second receiving antennas; and
    signal processing means cross-correlating the signals received by said first and second antennas;
    wherein said front-end electronic circuitry comprises:
       a plurality of first and second front-end amplifiers; and
       a plurality of respective switching circuits for connecting each element of said first receiving antenna to an input port of a respective first or second amplifier,
       and for connecting each element of said second receiving antenna to an input port of a respective second or first amplifier, said switching circuits also being for connecting the input ports of said first and second front-end amplifiers to respective temperature-monitored loads in order to perform absolute gain calibration;
    and wherein both said first and second receiving antennas are directive and steerable antennas; and wherein said apparatus further comprises antenna control means for steering at least one receiving lobe of said first antenna toward said remote satellite emitter, and at least one receiving lobe of said second antenna toward a point on the Earth's surface specularly reflecting said signal emitted by a remote satellite emitter toward said second receiving antenna;
    the method comprising the steps of:
    (a) connecting the first receiving antenna to the input ports of the first front-end amplifiers while directing the receiving lobes thereof toward cold space, and performing first power measurements;
    (b) connecting said temperature-monitored loads to the input ports of said front-end amplifiers and performing second power measurements;
    (c) repeating steps (a) and (b) while introducing a constant attenuation value after said first front-end amplifiers, thus performing third and fourth measurements;
    (d) determining at least a set of end-to-end gain values for signal processing chains including said first front-end amplifiers on the basis of said first to fourth measurements;
    (e) repeating steps (a) to (d) for the second front-end amplifiers.

13. A method of calibrating a space-borne altimetry apparatus comprising
    a first receiving antenna, pointing to outer space, for receiving at least one signal emitted by a remote satellite emitter via a direct path;
    a second receiving antenna, pointing to the Earth, for receiving said signal via an indirect path including a reflection from the Earth's surface, said first and second receiving antennas being mounted back-to-back on a common supporting structure;
    front-end electronic circuitry sandwiched between said first and second receiving antennas; and
    signal processing means cross-correlating the signals received by said first and second antennas;
    wherein said front-end electronic circuitry comprises:
       a plurality of first and second front-end amplifiers; and
       a plurality of respective switching circuits for connecting each element of said first receiving antenna to an input port of a respective first or second amplifier, and for connecting each element of said second receiving antenna to an input port of a respective second or first amplifier;

and wherein both said first and second receiving antennas are directive and steerable antennas; and wherein said apparatus further comprises antenna control means for steering at least one receiving lobe of said first antenna toward said remote satellite emitter, and at least one receiving lobe of said second antenna toward a point on the Earth's surface specularly reflecting said signal emitted by a remote satellite emitter toward said second receiving antenna;

the method comprising the steps of:

(a) connecting the first receiving antenna to the input ports of the first front-end amplifiers while directing the receiving lobes thereof toward cold space, and performing first power measurements;

(b) connecting said temperature-monitored loads to the input ports of said first front-end amplifiers and performing second power measurements;

(c) repeating steps (a) and (b) while introducing constant attenuation values after said first or second front-end amplifiers, thus performing third and fourth measurements;

(d) determining at least a first set of end-to-end gain values for signal processing chains including said first front-end amplifiers on the basis of said first to fourth measurements;

(e) turning the apparatus upside-down, for pointing the first receiving antenna toward the Earth and the second receiving surface toward the outer space;

(f) connecting the second receiving antenna to the input ports of the second front-end amplifiers, while directing the receiving lobes thereof toward cold space, and performing fifth power measurements;

(g) connecting said temperature-monitored loads to the input ports of said second front-end amplifiers and performing sixth power measurements;

(h) repeating steps (f) and (g) while introducing constant attenuation values after said second front-end amplifiers thus performing seventh and eighth measurements; and (e) determining at least a second set of end-to-end gain values for signal processing chains including said second front-end amplifiers on the basis of said fifth to eighth measurements;

14. A method of self-calibrating a space-borne altimetry apparatus comprising a first receiving antenna, pointing to outer space, for receiving at least one signal emitted by a remote satellite emitter via a direct path;

a second receiving antenna, pointing to the Earth, for receiving said signal via an indirect path including a reflection from the Earth's surface, said first and second receiving antennas being mounted back-to-back on a common supporting structure;

front-end electronic circuitry sandwiched between said first and second receiving antennas; and signal processing means cross-correlating the signals received by said first and second antennas;

wherein said front-end electronic circuitry comprises:

a plurality of first and second front-end amplifiers; and a plurality of respective switching circuits for connecting each element of said first receiving antenna to an input port of a respective first or second amplifier, and for connecting each element of said second receiving antenna to an input port of a respective second or first amplifier, said switching circuits also being for connecting the input ports of said first and second front-end amplifiers to respective temperature-monitored loads in order to perform absolute gain calibration;

and wherein both said first and second receiving antennas are directive and steerable antennas; and wherein said apparatus further comprises antenna control means for steering at least one receiving lobe of said first antenna toward said remote satellite emitter, and at least one receiving lobe of said second antenna toward a point on the Earth's surface specularly reflecting said signal emitted by a remote satellite emitter toward said second receiving antenna;

the method comprising the steps of:

(a) alternatingly connecting the first receiving antenna to the input ports of said first and second amplifiers, and the second receiving antenna to the input ports of the second or first amplifiers;

(b) averaging the values of delay observables computed when the first receiving antenna is connected to the input ports of the first amplifiers and the second receiving antenna to the input ports of the second amplifiers, and when the first receiving antenna is connected to the input ports of the second amplifiers, and the second receiving antenna to the input port of the first amplifiers.

15. A method of calibrating a space-borne altimetry apparatus comprising a first receiving antenna, pointing to outer space, for receiving at least one signal emitted by a remote satellite emitter via a direct path;

a second receiving antenna, pointing to the Earth, for receiving said signal via an indirect path including a reflection from the Earth's surface, said first and second receiving antennas being mounted back-to-back on a common supporting structure;

front-end electronic circuitry sandwiched between said first and second receiving antennas; and signal processing means cross-correlating the signals received by said first and second antennas;

wherein said front-end electronic circuitry comprises:

a plurality of first and second front-end amplifiers; and a plurality of respective switching circuits for connecting each element of said first receiving antenna to an input port of a respective first or second amplifier, and for connecting each element of said second receiving antenna to an input port of a respective second or first amplifier, said switching circuits also being for connecting the input ports of said first and second front-end amplifiers to respective temperature-monitored loads in order to perform absolute gain calibration;

and wherein both said first and second receiving antennas are directive and steerable antennas; and wherein said apparatus further comprises antenna control means for steering at least one receiving lobe of said first antenna toward said remote satellite emitter, and at least one receiving lobe of said second antenna toward a point on the Earth's surface specularly reflecting said signal emitted by a remote satellite emitter toward said second receiving antenna;

the method comprising the steps of:

(a) alternatingly connecting the first receiving antenna to the input ports of said first and second amplifiers, and the second receiving antenna to the input ports of the second and first amplifiers;

(b) computing a difference between values of delay observables measured when the first receiving antenna is connected to the input ports of the first amplifiers and the second receiving antenna to the input ports of the second amplifiers, and when the first receiving antenna is connected to the input ports of the second amplifiers, and the second receiving antenna to the input port of the first amplifiers; and (c) determining, on the basis of said difference, a delay calibration parameter for the apparatus.

16. A space-borne altimetry apparatus comprising:

a first receiving antenna, pointing to outer space, for receiving at least one signal emitted by a remote satellite emitter via a direct path;

a second receiving antenna, pointing to the Earth, for receiving said signal via an indirect path including a reflection from the Earth surface; and signal processing means for cross-correlating the signals received by said first and second antennas;

wherein both said first and second receiving antennas are directive and steerable antennas; and wherein said apparatus further comprises antenna control means for steering at least one receiving lobe of said first antenna toward said remote satellite emitter, and at least one receiving lobe of said second antenna toward a point on the Earth's surface specularly reflecting said signal emitted by a remote satellite emitter toward said second receiving antenna, and wherein disposed between said first and second antenna, a plurality of front-end modules associated to respective antenna elements of said first and second receiving antennas, each front-end module comprising:

a first and a second amplifier; and a switching system adapted for connecting an antenna element of said first receiving antenna to an input port of the first or second amplifier, and for connecting an antenna element of said second receiving antenna to an input port of the second or first amplifier.

17. The space-borne altimetry apparatus according to claim 15 wherein the switching systems of said front-end modules are also for connecting the input ports of said first and second front-end amplifiers to respective temperature-monitored loads in order to perform absolute gain calibration.

* * * * *

UNITED STATES PATENT AND TRADEMARK OFFICE
CERTIFICATE OF CORRECTION

Page 1 of 1

PATENT NO. : 7,808,425 B2
APPLICATION NO. : 12/236025
DATED : October 5, 2010
INVENTOR(S) : Martin Neira et al.

It is certified that error appears in the above-identified patent and that said Letters Patent is hereby corrected as shown below:

Column 3,
Line 27, cancel "3 o".

Column 14,
Line 15, "claim 15" should read --claim 16--.

Signed and Sealed this
Sixteenth Day of August, 2011

David J. Kappos
*Director of the United States Patent and Trademark Office*